Oct. 5, 1926.
L. CARLSON
COMBINATION JACK AND RIM TOOL
Filed August 10, 1925   2 Sheets-Sheet 1
1,602,335
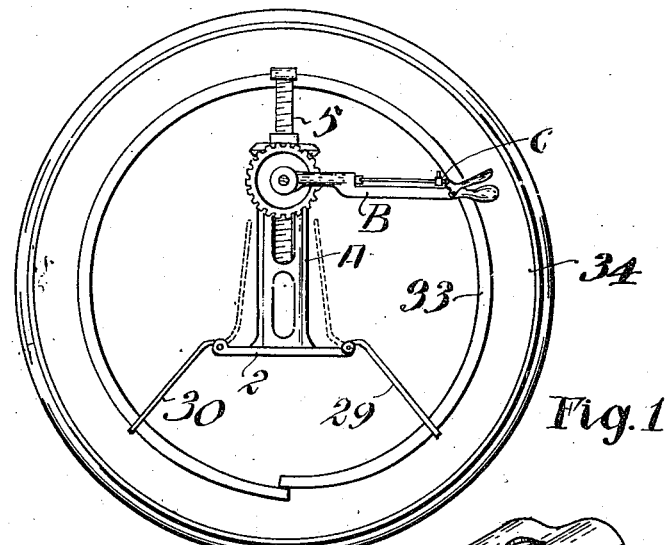
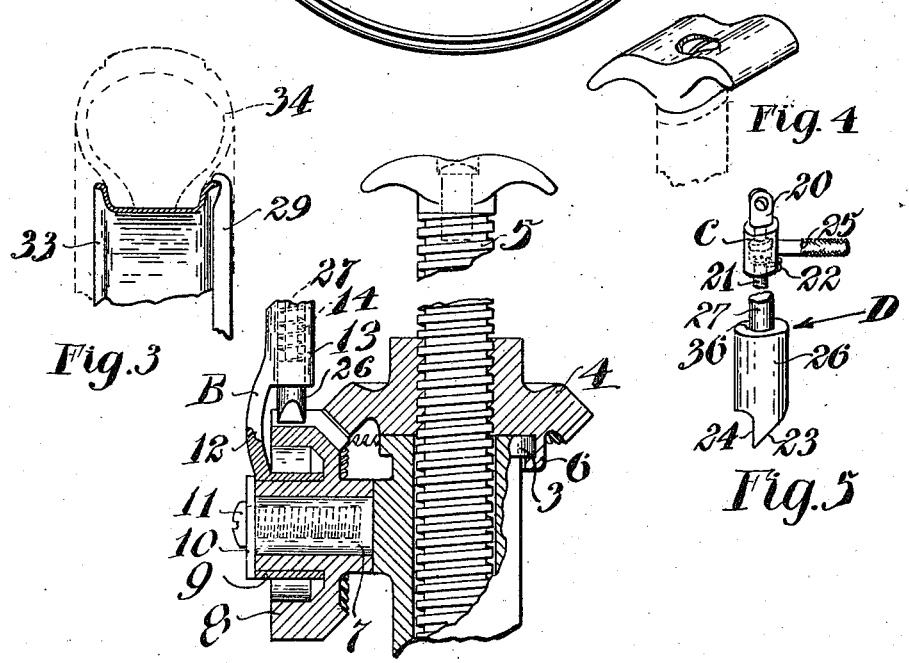
Inventor
Leonerd Carlson
By H. C. Johnson
Attorney Oct. 5, 1926.  
L. CARLSON  
1,602,335  
COMBINATION JACK AND RIM TOOL  
Filed August 10, 1925   2 Sheets-Sheet 2
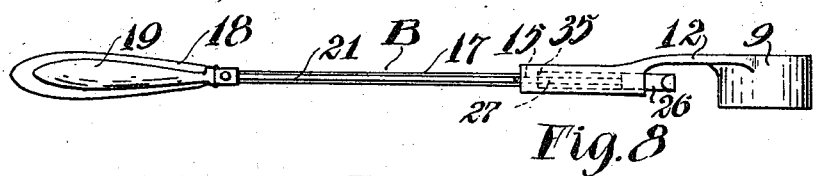
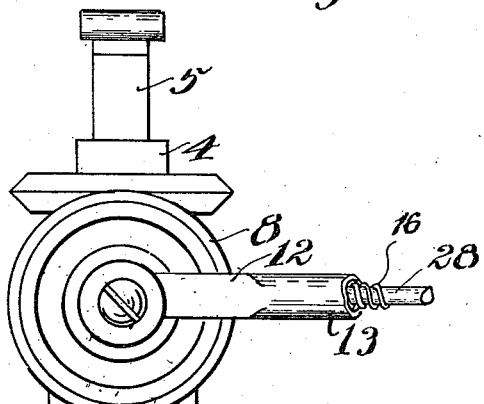
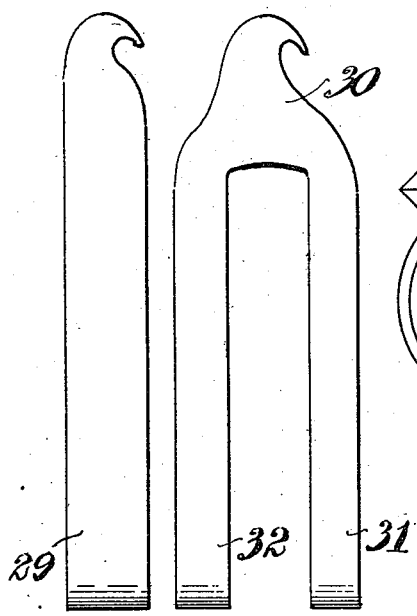
Inventor  
Leonerd Carlson  
By A. P. Johnson  
Attorney Patented Oct. 5, 1926.

1,602,335

UNITED STATES PATENT OFFICE.

LEONERD CARLSON, OF HUDSON, WISCONSIN.

COMBINATION JACK AND RIM TOOL.

Application filed August 10, 1925. Serial No. 49,215.

The present invention relates to a combined jack and rim tool.

In removing demountable rims from pneumatic automobile tires, especially those of the larger sizes, it is desirable to compress the rim so as to reduce its diameter and thereby facilitate the removal of the tire therefrom.

It is common practice to use an instrument for compressing the demountable rim of a pneumatic tire to facilitate its removal from a tire, but such tools are usually too bulky to be conveniently carried in the tool compartment of an automobile.

An object of the present invention is to make a jack having extensible rim gripping members thereon to compress a rim for removal from a tire.

Another object is to provide a jack with rim gripping extensions connected thereto, which extensions are foldable under the bottom of the jack to form an enlarged base therefor.

In order to attain these objects there is provided, in accordance with one feature of the invention, a jack, the extensible power member of which is provided with a cap having a concave under surface, the base of the jack being provided with a pair of hooked extensions pivotally connected thereto, the extensions being foldable to lie transversely beneath the bottom of the jack to enlarge the base area thereof, and being pivotally movable to lie radially of a point substantially centrally of the jack to grip a rim and exert a compressive influence thereon to reduce the diameter of the rim to faciliate its removal from a tire with which it is associated.

These and other features of the invention, not specifically mentioned will be more fully brought out in the following description and the accompanying drawings, wherein:

Figure 1, is a view in side elevation of a combined jack and rim tool in engagement with a demountable rim mounted interiorly of a pneumatic tire.

Figure 2, is a view, partly in section, of the mechanism for operating the power member of the device.

Figure 3, is a sectional view through a demountable rim with one of the rim engaging extensions of the combined jack and rim tool in engagement therewith for a compressive action, a tire mounted upon the rim being indicated in dotted lines.

Figure 4, is a view in isometric perspective of a load supporting and rim engaging member which is pivotally mounted on top of the power screw.

Figure 5, is a view, also in isometric perspective, of a portion of a reversible pawl, an operative rod therefor being shown broken away.

Figure 6, is a view in side elevation of the combined jack and rim tool with the rim engaging extensions folded to lie transversely beneath the jack to form an enlarged base.

Figure 7, is a bottom view of the base of the jack shown in Figure 6.

Figure 8, is a view in top elevation of an operating lever; and

Figure 9, is a view in bottom elevation of the two rim engaging extensions which are pivotally connected to the bottom of the jack.

Referring to the drawings in detail, a jack A comprises a vertical housing member 1 having a base portion 2 integrally connected thereto. The upper portion of the housing 1 is circular and is provided with a rim 3 extending entirely around the upper portion thereof. Mounted upon the upper portion of the housing 1 is a gear 4 which is threaded interiorly to receive a power screw 5, the gear 4 being provided with a downwardly extending and inwardly turned flange 6 which extends substantially half way around the gear 4 to permit the flange to be slid into engagement with the rim 3 before introducing the power screw into the housing 1. Upon screwing the power screw through the gear 4 so as to extend into the interior of the housing, the gear is thereby locked onto the rim 3 to prevent separation of the gear from the housing when a lifting force is exerted upon the power screw. A stud 7 extends laterally from the housing, being integral therewith, and upon the stud a second gear 8 is rotatably mounted. The teeth of the gear 8 extend, for a portion of their length, parallel with the axis of the gear 8, and then angularly for the remainder of their distance to engage the teeth of the gear 4 mounted upon the upper portion of the housing. Rotatably mounted upon the hub of the gear 8 is a collar 9 having integral therewith a lever B. A washer 10, which is preferably of tempered steel, is held in position by means of a screw 11 threaded into the stud 7 to hold the gear 8 and the collar 9 firmly in position. The structure of the lever B is clearly shown in Figures 1 and 8. The collar 9 has integrally connected thereto a flattened portion 12 extending outwardly to a distance greater than the radius of the gear 8. Integrally connected to the flattened portion 12 is a rounded portion 13 having a longitudinal central opening 14 therein, the diameter of the opening being reduced at 15 (see Figure 8) to form a shoulder to retain a spring 16 in compression therein. A flattened lever portion 17 is integrally connected to the rounded portion 13 and is offset therefrom as clearly shown in Figure 1. The flattened portion 17 is provided with a handle 18 at its outer end to provide means for manually operating the mechanism. Pivotally connected to the lever B, and laterally adjacent the handle portion 18 thereof is a pawl release lever 19, the inner end thereof being pivotally connected to a short rod 20 (see Figure 5). The rod 20 is provided with a swivel joint C shown in Figure 5, a second rod 21 being firmly connected to the swivel C as by means of a set screw 22. The rod 21 is hooked into engagement with a pawl D slidably mounted in the opening 14 of the lever B. The pawl comprises an enlarged lower portion 26 and a reduced upper portion 27. One face 23 of the lower end of the pawl is shaped to lie at an angle with the axis of the pawl, the other side 24 being cut to lie parallel with the axis of the pawl.

The swivel joint C is provided with an operating handle 25 integrally connected thereto to lie at right angles with the axis of rotation of the swivel, the swivel being firmly connected against rotation to the rod 20 by means of a set screw 22.

The spring 16 is mounted in the opening 14 of the rounded portion of the lever B to have its outer end supported on the shoulder 35 formed by the reduction of the size of the opening 14 at its outer end, the inner end of the spring being supported on the shoulder 36 intermediate the enlarged lower portion 26 and the reduced upper portion 27 of the pawl to hold the spring 16 in compression, and resiliently force the pawl into engagement with the teeth of gear 8. Moving the swivel C by means of the laterally extending lever 25 upon the rod 20 as a pivot changes the position of the pawl to reverse the direction in which the straight face 24 of the pawl is positioned.

Pivotally connected to the ends of the base 2 of the jack are members 29 and 30. The member 29 is pivotally connected centrally of the end of the base 2, and is half the width of the base. The member 30 is connected to the opposite end of the base from member 29 and is constructed with a pair of side members 31 and 32, each of which is substantially one-fourth the width of the base, leaving an opening between the side members of a width to receive member 30. The outer end of each of the members 29 and 30 is hook shaped to grip a rim. The members 29 and 30 are preferably formed of a good grade of spring steel, so as to avoid distortion under a bending stress, as when the jack is used to raise a car with members 29 and 30 disposed as in Figure 6. When the jack is stored, as in the tool compartment of a car, members 29 and 30 may be pivotally moved to lie along the sides of the jack as indicated in dotted lines in Figure 1.

In using the device as a jack, the operation thereof is the same as that of an ordinary type of jack, the members 29 and 30 being moved pivotally either to lie in an extended position along the ground so as to place the weight of the car upon the base of the jack, or to lie beneath the base of the jack as shown in Figures 6 and 7, as desired. In actuating the power screw, before the load is placed thereon, it is necessary to manipulate the pawl by means of the pawl lever 19. The small, laterally extending handle 25 may be moved to rotate the pawl so as to have the straight face 24 thereof positioned to face the direction in which it is desired to rotate the gear 8. During an operative movement of the handle B the straight face of the pawl engages a tooth of the gear 8, while during a recovery of the handle for the next stroke, the pawl is raised from engagement with the gear by compressing the lever 19 against the handle 18. After the power screw is in operative engagement with the load, the sloped face 23 of the pawl lifts it over the teeth of the gear during a recovery stroke of the handle and removes the necessity for further manipulation of the pawl by means of the lever.

To remove a rim 33 from a tire 34, the ends of the tire rim are placed in overlapping relation as indicated in Figure 1, as by striking one end of the rim to knock it inwardly over the other end of the rim in a well known manner. After the ends of the rim are in overlapping relation the jack and rim tool of the present invention is placed in position to engage the rim, as shown in Figure 1. The pawl is turned to have operative engagement with the gear 8 to draw the power screw into the housing. The lever B is then operated to place the rim under compression radially toward its center to thereby reduce the diameter of the rim. When the rim has been sufficiently compressed to permit its withdrawal from the interior of the tire, such withdrawal is effected. The tire may then be repaired and the rim replaced interiorly thereof. The action on the power screw may then be reversed by reversing the position of the pawl and manipulating the lever B to release the rim, which expands back to its original shape.

What I claim is:

1. A combined jack and rim tool, comprising a housing having an enlarged base portion, a pair of rim gripping members pivotally connected to opposite ends of the base portion and pivotally movable to lie substantially radially of a point interiorly of the housing, and movable to lie transversely across the bottom of the base in overlapping relation, the ends thereof extending beyond said base to increase the area thereof, an extensible member operatively associated with the housing and having means integral therewith to grip a rim, and reversible power means operatively associated with the housing and the extensible member to forcibly move the extensible member into or out of the housing.

2. In a device of the character described, the combination, with a jack having reversible power means to forcibly move the extensible member of the jack in either direction, of a pair of rim gripping members pivotally connected to opposite ends of the base of the jack to lie substantially radially of a point interiorly of the jack during a rim gripping operation and to be foldable transversely of the base of the jack during a load raising operation, one of said members being provided with an opening centrally thereof of a width to receive the other of said members when said members are positioned to lie transversely beneath the base of the jack.

In testimony whereof I affix my signature.

LEONERD CARLSON.